US009693001B2

(12) United States Patent
Kim et al.

(10) Patent No.: US 9,693,001 B2
(45) Date of Patent: *Jun. 27, 2017

(54) IMAGE SENSOR, OPERATING METHOD THEREOF, AND SYSTEM INCLUDING SAME

(71) Applicant: Samsung Electronics Co., Ltd., Suwon-si, Gyeonggi-do (KR)

(72) Inventors: Moo Young Kim, Suwon-si (KR); Tae Chan Kim, Yongin-si (KR); Jae Cheol Yun, Seoul (KR); Seog Heon Ham, Suwon-si (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/234,334

(22) Filed: Aug. 11, 2016

(65) Prior Publication Data

US 2016/0353041 A1 Dec. 1, 2016

Related U.S. Application Data

(63) Continuation of application No. 14/146,819, filed on Jan. 3, 2014, now Pat. No. 9,432,605.

(30) Foreign Application Priority Data

Jan. 24, 2013 (KR) ........................ 10-2013-0007874

(51) Int. Cl.
*H04N 5/369* (2011.01)
*H04N 5/232* (2006.01)
*H04N 5/374* (2011.01)
*H04N 5/3745* (2011.01)
*H04N 5/91* (2006.01)
*H04N 5/343* (2011.01)

(52) U.S. Cl.
CPC ....... *H04N 5/3698* (2013.01); *H04N 5/23206* (2013.01); *H04N 5/23245* (2013.01); *H04N 5/23254* (2013.01); *H04N 5/343* (2013.01); *H04N 5/37455* (2013.01); *H04N 5/91* (2013.01)

(58) Field of Classification Search
CPC ...... H04N 5/91; H04N 5/343; H04N 5/23251; H04N 5/23254; H04N 5/37455
USPC .................... 348/208.1, 222.1, 294; 341/155
See application file for complete search history.

(56) References Cited

U.S. PATENT DOCUMENTS

| 4,786,818 A | 11/1988 | Mead et al. |
| 5,781,648 A | 7/1998 | Sarpeshkar et al. |
| 5,990,471 A | 11/1999 | Watanabe |
| 6,023,058 A | 2/2000 | Merle et al. |

(Continued)

FOREIGN PATENT DOCUMENTS

KR 100615397 B1 8/2006

*Primary Examiner* — Nhan T Tran
(74) *Attorney, Agent, or Firm* — Harness, Dickey & Pierce, P.L.C.

(57) ABSTRACT

A method of operating an image processing system includes storing differences between first analog pixel signals and second analog pixel signals and converting the stored differences to one-bit digital signals, the first analog pixel signals being output from a plurality of pixels and corresponding to a previous frame, and the second analog pixel signals being output from the plurality of pixels and corresponding to a current frame.

20 Claims, 22 Drawing Sheets

(56) References Cited

U.S. PATENT DOCUMENTS

| | | | |
|---|---|---|---|
| 6,590,611 B1* | 7/2003 | Ishida | H04N 5/23248 |
| | | | 348/208.12 |
| 7,579,576 B2 | 8/2009 | Sugiyama et al. | |
| 7,728,269 B2 | 6/2010 | Lichtsteiner et al. | |
| 7,772,537 B2 | 8/2010 | Boemler | |
| 8,089,522 B2 | 1/2012 | Choi et al. | |
| 8,120,668 B2 | 2/2012 | Kurokawa | |
| 2003/0035059 A1 | 2/2003 | Suzuki | |
| 2008/0231736 A1 | 9/2008 | Solhusvik | |
| 2009/0251579 A1 | 10/2009 | Schrey et al. | |
| 2010/0060765 A1 | 3/2010 | Kim et al. | |
| 2010/0073294 A1 | 3/2010 | Kim et al. | |
| 2010/0207798 A1* | 8/2010 | Lim | H03K 21/023 |
| | | | 341/155 |
| 2010/0225796 A1* | 9/2010 | Lim | H04N 5/378 |
| | | | 348/308 |
| 2010/0277607 A1* | 11/2010 | Choi | H04N 5/35554 |
| | | | 348/222.1 |
| 2012/0061568 A1* | 3/2012 | Lee | G06K 9/00335 |
| | | | 250/338.1 |

* cited by examiner

IMAGE SENSOR, OPERATING METHOD THEREOF, AND SYSTEM INCLUDING SAME

CROSS-REFERENCE TO RELATED APPLICATIONS

This application is a continuation of U.S. application Ser. No. 14/146,819, filed on Jan. 3, 2014, which claims priority under 35 U.S.C. §119(a) from Korean Patent Application No. 10-2013-0007874 filed on Jan. 24, 2013, the entire disclosure of each of which is hereby incorporated by reference herein.

BACKGROUND

Example embodiments of the inventive concepts relate to an image sensor and devices using the same.

A CMOS image sensor is a solid-state image sensing device using a complementary metal-oxide semiconductor (CMOS). The CMOS image sensor has lower manufacturing costs, a smaller size and consumes less power than a charge coupled device (CCD) image sensor which may include a high voltage analog circuit.

In recent years, as performance of the CMOS image sensor is improved, the CMOS image sensor has been widely used in various electronic products including portable devices such as a smart phone or a digital camera.

In a mobile device field where power consumption needs to be reduced as much as possible, a study for reducing power consumption of the CMOS image sensor has been actively proceeding.

SUMMARY

An example embodiment of the present inventive concepts is directed to a method of operating an image processing system.

According to an example embodiment, the method includes storing differences between a plurality of analog pixel signals which are output from the plurality of pixels and correspond to a previous frame and a plurality of second analog pixel signals which are output from the plurality of pixels and correspond to a current frame, and converting the stored differences into one-bit digital signals.

According to an example embodiment, the operation method may further include recognizing a motion of an object between the previous frame and the current frame by using the plurality of one-bit digital signals.

According to an example embodiment, each of the first analog pixel signals may correspond to an amount of charge of photo charges accumulated in each of the plurality of pixels during the previous frame, and each of the second analog pixel signals may correspond to an amount of charge of photo charges accumulated in each of the plurality of pixels during the current frame. According to an example embodiment, a first analog pixel signal output from one of the plurality of pixels and a second analog pixel signal output from the one pixel may be sequentially output during the current frame.

According to an example embodiment, the operation method may further include performing an auto zeroing of an analog to digital conversion circuit included in the image processing system based on each of the first analog pixel signals. According to an example embodiment, each of the second analog pixel signals may be output from each of the plurality of pixels after the auto-zeroing operation.

According to an example embodiment, the operation method may further include selecting an activation pixel group including the plurality of pixels among all the pixels included in a pixel array before the storing.

According to an example embodiment, the plurality of pixels included in the activation pixel group may be adjacent to each other. According to an example embodiment, the activation pixel group may be positioned at edges of the pixel array. According to an example embodiment, the plurality of pixels included in the activation pixel group may not be adjacent to each other.

An example embodiment of the present inventive concepts is directed to an image sensor, including a pixel array including a plurality of pixels, a pixel signal difference storage circuit storing each difference between each of a plurality of first analog pixel signals which are output from the plurality of pixels and correspond to a previous frame and each of a plurality of second analog pixel signals which are output from the plurality of pixels and correspond to a current frame, and an analog to digital conversion circuit converting each of the stored differences into each of a plurality of one-bit digital signals.

According to an example embodiment, the pixel signal difference storage circuit may include a plurality of coupling capacitors each storing each of the differences.

According to an example embodiment, the analog to digital conversion circuit includes a plurality of comparators, each of the plurality of comparators compares each of the stored differences and a reference voltage, and output each of the plurality of one-bit digital signals according to the results of the comparison.

According to an example embodiment, each of the plurality of coupling capacitors may adjust a voltage of each comparison value input node of the plurality of comparators based on each of the differences, and each of the plurality of comparators may compare the adjusted voltage of a comparison value input node and the reference voltage.

According to an example embodiment, the image sensor may further include first initialization switches each connected between the comparison value input node of each of the plurality of comparators and a first output node of each of the plurality of comparators. As each of the first initialization switches is turned on, the voltage of the comparison value input node of each of the plurality of comparators may be initialized to be equal to the reference voltage.

According to an example embodiment, each of the first initialization switches is turned off after the voltage of the comparison value input node becomes equal to the reference voltage, and each of the plurality of pixels may perform a reset operation after each of the first initialization switches is turned off.

According to an example embodiment, the image sensor may further include a reference voltage supply circuit supplying the reference voltage to a reference value input node of each of the plurality of comparators.

According to an example embodiment, the reference voltage supply circuit may include second initialization switches each connected between a second output node of each of the plurality of comparators and the reference value input node of each of the plurality of comparators and switched with each of the first initialization switches.

According to an example embodiment, the reference voltage supply circuit may include a first switch array supplying one of a ramp signal and the reference voltage to the reference value input node based on a mode selection signal.

According to an example embodiment, the image sensor may further include a second switch array transmitting each of the plurality of one-bit digital signals to a counter or a latch based on the mode selection signal.

According to an example embodiment, the image sensor may further include a power management unit controlling a power supplied to the counter or a ramp signal generator generating the ramp signals based on the mode selection signal.

According to an example embodiment, a reference voltage supplied to one of the plurality of comparators may be different from a reference voltage supplied to the other of the plurality of comparators.

According to a example embodiment, the image sensor may further include a pixel signal output switch which is connected between each of the plurality of pixels and each of the plurality of coupling capacitors, and controls an output of each of the plurality of first analog pixel signals and each of the plurality of second analog pixel signal.

An example embodiment of the present inventive concepts is directed to an image processing system, including an image sensor, and an image signal processor (ISP) processing image data output from the image sensor and recognizing a motion of an object between a previous frame and a current frame. The image sensor may include a pixel array including a plurality of pixels, a pixel signal storage circuit which stores each difference between each of a plurality of first analog pixel signals, output from the plurality of pixels and corresponding to the previous frame, and each of a plurality of second analog pixel signals, output from the plurality of pixels and corresponding to the current frame, an analog to digital conversion circuit converting each of the stored differences into each of a plurality of one-bit digital signals, and a latch block outputting the image data based on the plurality of converted one-bit digital signals.

An example embodiment of the present inventive concepts is directed to an electronic device.

According to an example embodiment, the electric device may including an image sensor, an image signal processor (ISP) processing image data output from the image sensor, and a display for displaying the processed image data. The image sensor may include a pixel array including a plurality of pixels, a pixel signal difference storage circuit which stores each difference between each of a plurality of first analog pixel signals, output from the plurality of pixels and corresponding to the previous frame, and each of a plurality of second analog pixel signals, output from the plurality of pixels and corresponding to the current frame, an analog to digital conversion circuit converting each of the stored differences into each of a plurality of one-bit digital signals, and a latch block outputting the image data based on the plurality of converted one-bit digital signals.

At least one example embodiment relates to an image sensor.

In one embodiment, the image sensor includes at least one pixel; and at least one readout circuit, the readout circuit configured to output a one-bit digital signal indicating whether a difference between a first analog signal and a second analog signal is greater than a reference voltage, the first analog signal representing a first frame sensed by the pixel, and the second analog signal representing a second frame sensed by the pixel, the readout circuit including, a storage device configured to store the difference between the first analog signal and the second analog signal, and an analog-to-digital converter configured to convert the stored difference to the one-bit digital signal.

In one embodiment, the analog-to-digital converter includes a comparator configured to compare the stored difference and the reference voltage and output a result of the comparison as the one-bit digital signal.

In one embodiment, the at least one pixel includes a photoelectric element configured to, generate the first analog signal according to an amount of photoelectric charge accumulated therein during the first frame, and generate the second analog signal according to an amount of photoelectric charge accumulated therein during the second frame; and a plurality of pixel switches configured to selectively provide the first analog signal and the second analog signal to the storage device.

In one embodiment, the analog-to-digital converter includes a first switch configured to selectively initialize a input node of comparator to a reference voltage, and wherein the plurality of pixel switches within the at least one pixel are configured to, provide the first analog signal to the storage device after the input node of the comparator is initialized to the reference voltage, and provide the second analog signal to the storage device after a reference node of the comparator is reset to the reference voltage such that a value stored in the storage device represents the difference between the first analog signal and the second analog signal.

In one embodiment, the analog-to-digital converter further includes a ramp signal generator configured to generate a ramp signal, if an operating mode of the image sensor is a color image sensing mode; a counter configured to count a time required for the one-bit digital signal to transition between a low level and a high level, if the operating mode of the image sensor is the color image sensing mode; switch array configured to selectively provide one of the ramp signal and the reference voltage to the reference node of the comparator based on the operating mode of the image sensor; and a power management unit configured to disable the ramp signal generator if the operating mode of the image sensor is a motion sensing mode.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE EMBODIMENTS

Figure 1:
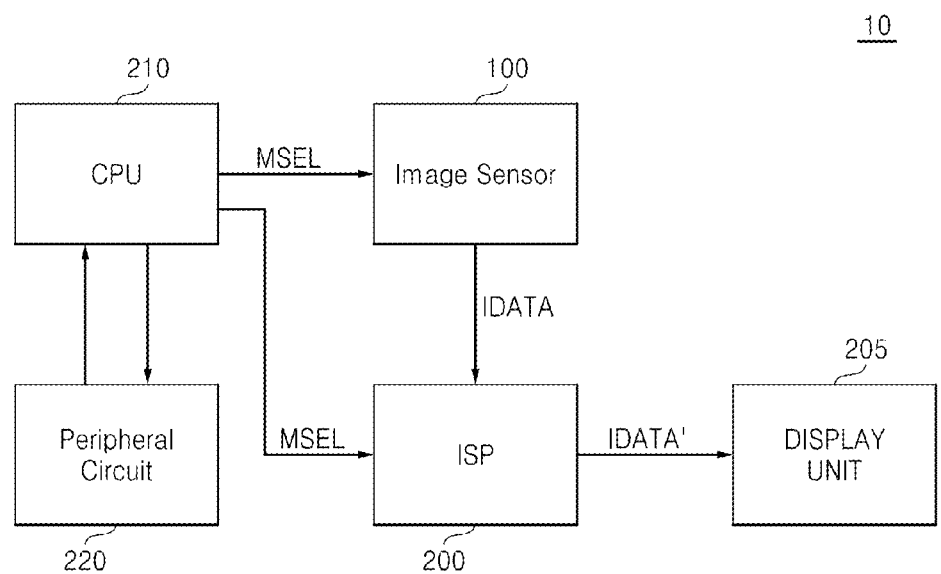
FIG. 1 is a block diagram of an image processing system according to an example embodiment of the present inventive concepts.

The present inventive concepts now will be described more fully hereinafter with reference to the accompanying drawings, in which example embodiments are shown. These inventive concepts may, however, be embodied in many different forms and should not be construed as limited to the example embodiments set forth herein. Rather, these example embodiments are provided so that this disclosure will be thorough and complete, and will fully convey the scope of the inventive concepts to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a block diagram of an image processing system according to an example embodiment of the present inventive concepts.

Referring to FIG. 1, an image processing system 10 may include an image sensor 100, an image signal processor (ISP) 200, a display unit 205, a central processing unit 210, and a peripheral circuit 220.

According to an example embodiment, the image sensor 100, the ISP 200, and the CPU 210 may be embodied in a system on chip. According to another example embodiment, the image sensor 100 and the ISP 200 may be embodied in a multi-chip package (MCP) or package on package (PoP).

The image processing system 10 may be configured to function as a color sensor to acquire color information of an object, a depth sensor to acquire depth information of the object, and/or a motion sensor to acquire motion information by sensing a motion of the object.

According to an example embodiment, when the image sensor 100 include color sensor pixels, the image sensor 100 may transmit image data IDATA including color information of an object or image data IDATA including motion information of the object to the ISP 200 based on a pixel signal output from each of the color sensor pixels according to a mode selection signal MSEL transmitted from the CPU 210.

For example, the image sensor 100 may output image data IDATA corresponding to motion information when the mode selection signal MSEL is at a first level, e.g., a low level, and output image data IDATA corresponding color information when the mode selection signal MSEL is at a second level, e.g., a high level; however, example embodiments are not restricted thereto.

According to another example embodiment, when the image sensor 100 includes depth sensor pixels, e.g., time-of-flight (TOF) sensor pixels, the image sensor 100 may transmit image data IDATA corresponding to depth information or depth image of an object or image data IDATA corresponding to motion information or motion image of the object to the ISP 200 based on a pixel signal output from each of the depth sensor pixels according to a mode selection signal MSEL transmitted from the CPU 210.

For example, the image sensor 100 may output the image data IDATA corresponding to motion information or motion image when the mode selection signal MSEL is at a first level, e.g., a low level, and output the image data IDATA corresponding to depth information or depth image when the mode selection signal MSEL is at a second level, e.g., a high level; however, it is not restricted thereto.

According to an example embodiment, the image sensor 100 may be embodied in a separate chip. For example, the image sensor 100 may be embodied in a CMOS image sensor chip.

The ISP 200 may receive image data IDATA, process the received image data IDATA and generate the processed image data IDATA'. According to an example embodiment, the ISP 200 may process the image data IDATA corresponding to color information, the image data IDATA corresponding to depth information, or the image data IDATA corresponding to motion information of an object in a different manner, according to mode selection signal MSEL.

According to an example embodiment, when the ISP 200 receives the image data IDATA corresponding to motion information of an object from the image sensor 100, the ISP 200 may process information on a change in amount of light and generate the processed data indicating motion of the object, i.e., motion data.

ISP 200 may correct light and shade, contrast, and/or chroma of image data IDATA. The ISP 200 may transmit the processed image data IDATA' to the display unit 205.

The display unit 205 may denote a display which may display the processed image data IDATA'. According to an example embodiment, the display unit 205 may be embodied in a Liquid Crystal Display (LCD), a light-emitting diode (LED) display, an organic light-emitting diode (OLED) display, an Active Matrix Organic Light Emitting Diodes (AMOLED) display, or a flexible display.

The CPU 210 may analyze data transmitted from the peripheral circuit 220, generate the mode selection signal MSEL based on a result of the analysis, and transmit the generated mode selection signal MSEL to the image sensor 100 and the ISP 200.

The peripheral circuit 220 may provide data occurred according to a status or various inputs of a system 10 for the CPU 210.

According to an example embodiment, the peripheral circuit 220 may be embodied in an input interface. In this case, the peripheral circuit 220 performing a function of the input interface may provide data occurred according to an input of a user for the CPU 210. The input interface may be an input device such as a button, a touch screen, a keyboard, or a mouse.

The CPU 210 may generate the mode selection signal MSEL based on the data provided by the peripheral circuit 220. According to another example embodiment, peripheral circuit 220 may be embodied in application execution module. In this case, the peripheral circuit 220 may monitor execution of specific application, and transmit data occurred according to the result of monitoring to CPU 210. The CPU 210 may generate the mode selection signal MSEL based on the data provided by the peripheral circuit 220. The specific application may be a camera driving application or an augmented reality application; however, example embodiments are not restricted thereto.

Figure 2:
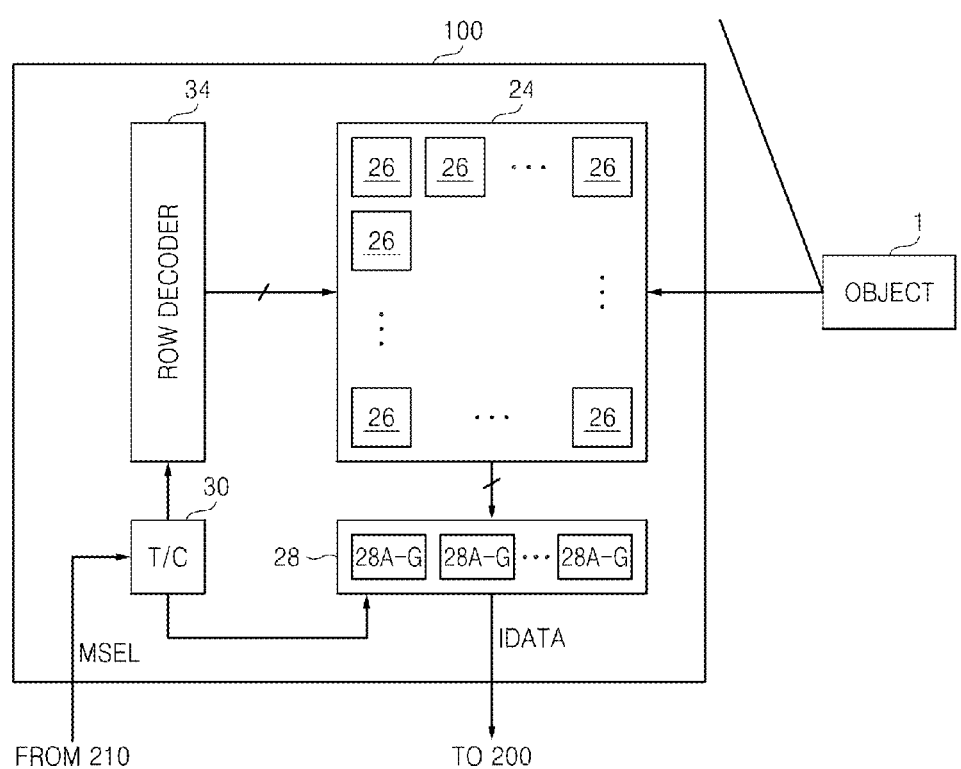
FIG. 2 is a block diagram according to an example embodiment of an image sensor illustrated in FIG. 1.

FIG. 2 is a block diagram according to an example embodiment of an image sensor illustrated in FIG. 1. For convenience of description, an object 1 is illustrated with the image sensor 100.

Referring to FIGS. 1 and 2, the image sensor 100 may include a pixel array 24, a readout circuit 28, a timing controller 30, and a row decoder 34.

The image sensor 100 may produce the image data IDATA corresponding to color information of the object 1 or the image data IDATA corresponding to motion information of the object 1, according to mode selection signal MSEL. According to an example embodiment, the image sensor 100 may get the image data IDATA corresponding to motion information of the object 1 regardless of the mode selection signal MSEL.

The pixel array 24 may include a plurality of pixels 26 for sensing light reflected from the object 1, e.g., visible light rays. The readout circuit 28 may generate image data IDATA based on pixel signals output from the pixel array 24. The timing controller 30 may control components of the image sensor 100, e.g., the readout circuit 28 and/or a row decoder 34, based on the mode selection signal MSEL transmitted from the CPU 210.

The row decoder 34 may decode a plurality of row control signals output from the timing controller 30, e.g., row address signals, and drive a specific row line included in the pixel array 24 according to a result of the decoding. The row decoder 34 may denote a concept including a row driver for driving a row line.

Figure 3:
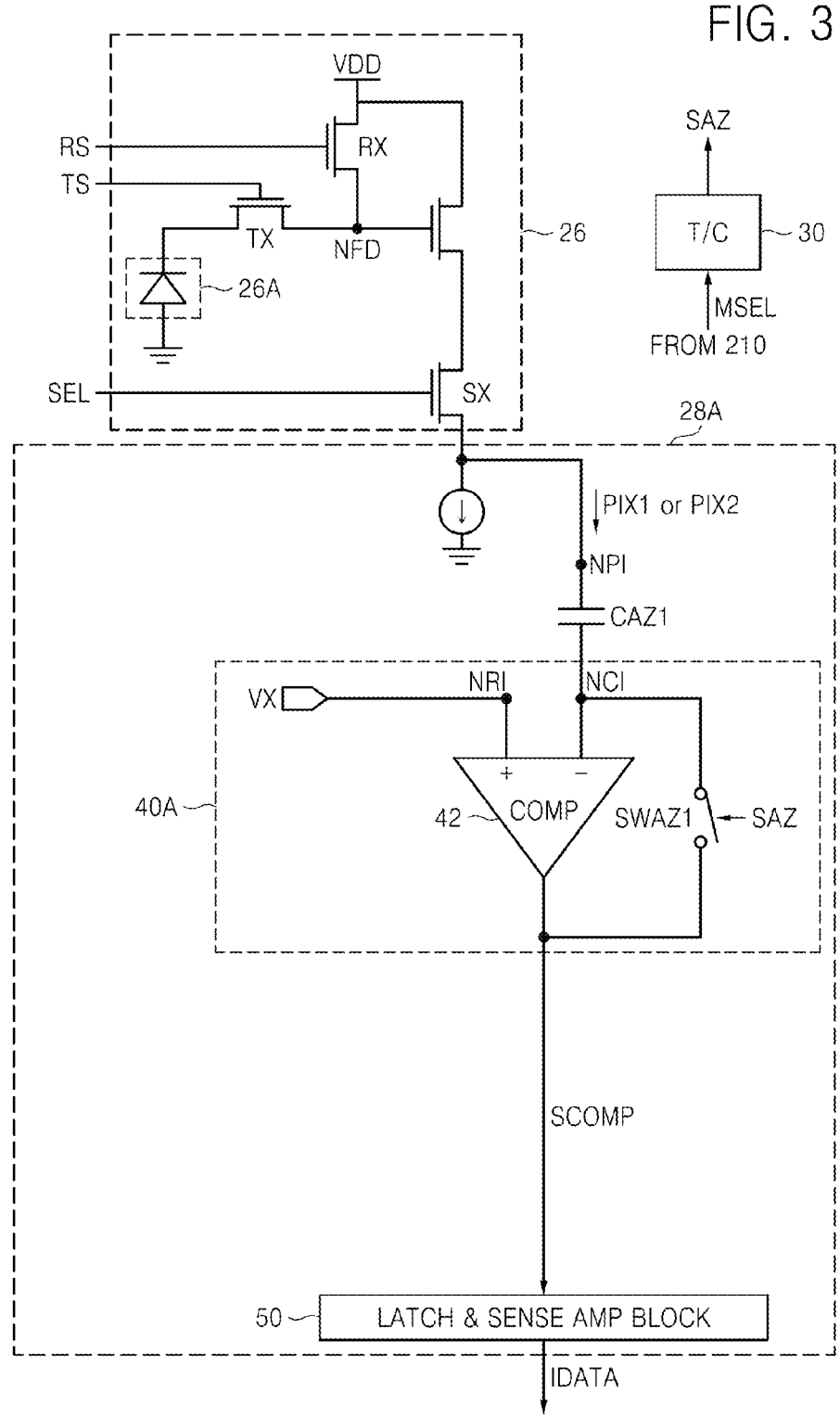
FIG. 3 is a circuit diagram of a pixel illustrated in FIG. 2 and a readout circuit according to an example embodiment.

FIG. 3 is a circuit diagram of the pixel illustrated in FIG. 2 and a readout circuit according to an example embodiment.

Referring to FIGS. 2 and 3, a pixel 26 may be embodied in a structure including four transistors. While it is illustrated that the pixel 26 has four transistors, example embodiments are not restricted thereto.

A photo-electric conversion element 26A generates photo charges according to incident light. The photo-electric conversion element 26A may be embodied in a photo diode, a photo transistor, a photo gate, or a pinned photo diode (PPD).

A transfer transistor TX transmits photo charges, generated in the photo-electric conversion element 26A, to a floating diffusion node (NFD) in response to a transmission control signal TS. A reset transistor RX resets the floating diffusion node (NFD) in response to a reset signal RS. A select transistor SX may output a pixel signal PIX1 or PIX2 corresponding to an amount of photo charges generated by the photo-electric conversion element 26A in response to a selection signal SEL.

A readout circuit 28A according to an example embodiment of the readout circuit 28 illustrated in FIG. 2 may include a first coupling capacitor CAZ1, an analog to digital conversion circuit 40A, and a latch and sense amplifier block 50.

The analog to digital conversion circuit 40A may include a first initialization switch SWAZ1 and a comparator 42.

The first coupling capacitor CAZ1 may maintain a voltage between a pixel signal input node NPI and a comparison value input node NCI with the first initialization switch SWAZ1 turned off.

The first initialization switch SWAZ1 may be turned on in response to a switching signal SAZ. As the first initialization switch SWAZ1 is turned on, a voltage of the comparison value input node NCI may be initialized to be the same as a reference voltage VX. The initialization may denote an auto zeroing operation.

A switching signal SAZ may be generated by the timing controller 30. The timing controller 30 may generate the switching signal SAZ based on the mode selection signal MSEL transmitted from the CPU (210 in FIG. 1).

The comparator 42 may compare the reference voltage VX input through a reference value input node NRI and a voltage of the comparison value input node NCI, and generate a comparison signal SCOMP according to a result of the comparison. The comparator 42 may transmit the generated comparison signal SCOMP to the latch and sense amplifier block 50.

The term of 'reference voltage' herein may denote not only a voltage supplied to the reference value input node NRI of the comparator 42, but also comprehensively a voltage which is a reference voltage when the comparator 42 generates a comparison signal SCOMP.

The latch & sense amplifier block 50 may include a latch (not shown) and a sense amplifier (not shown). The latch may store the comparison signal SCOMP. The sense amplifier may sense and amplify the comparison signal SCOMP stored in the latch, and output this as image data IDATA.

An operation of the analog to digital conversion circuit 40A will be described in detail referring to FIGS. 4 and 5.

Figure 4:
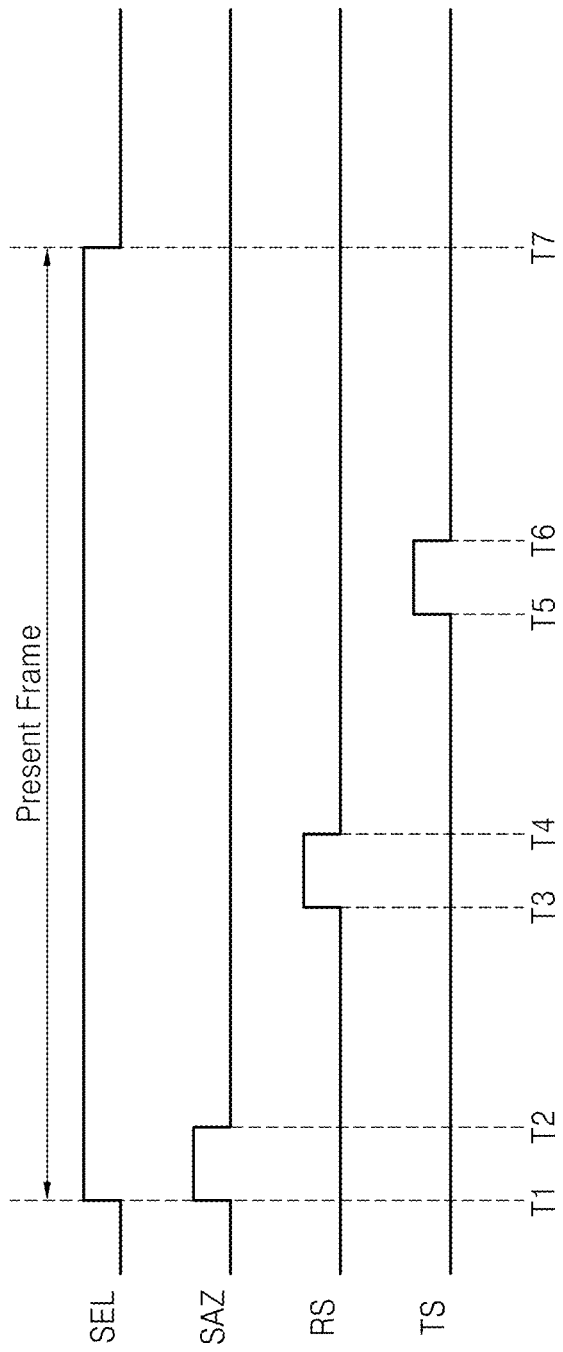
FIG. 4 is a timing diagram according to an example embodiment of control signals illustrated in FIG. 3.

FIG. 4 is a timing diagram according to an example embodiment of control signals illustrated in FIG. 3.

Referring to FIGS. 3 and 4, a selection transistor SX may be turned on in a section between a first time T1 and a seventh time T7 which corresponds to a present frame in response to a selection signal SEL.

The first initialization switch SWAZ1 may be turned on from the first time T1 to a second time T2 in response to a switching signal SAZ. As the first initialization switch SWAZ1 is turned on, an initialization operation may be performed so that a voltage of the comparison value input node NCI may be the same as the reference voltage VX.

Since the initialization operation is performed before a reset operation of the pixel 26 (i.e., before a reset transistor RX is turned on), photo charges accumulated during a previous frame are maintained in the floating diffusion node NFD of the pixel 26 when performing the initialization operation. That is, a first pixel signal PIX1 is output from the pixel 26, which corresponds to an amount of photo charges accumulated during a previous frame when performing the initialization operation, and a voltage of the pixel signal input node NPI is determined by the first pixel signal PIX1.

At both ends of the first coupling capacitor CAZ1 through the initialization operation, a voltage difference VPIX1-VX corresponding to a difference between a voltage VPIX1 of the first pixel signal PIX1 and the reference voltage VX occurs. Since the first initialization switch SWAZ1 is turned off at a second time T2, a voltage difference between both ends of the first coupling capacitor CAZ1 is maintained.

The reset transistor RX may be turned on from the third time T3 to the fourth time T4 in response to a reset control signal RS. As the reset transistor RX is turned on, a floating diffusion node NFD where photo charges accumulated during a previous frame remains may be reset.

Photo charges corresponding to a current frame may be generated by the photoelectric conversion element 26A from the fourth time T4 to a fifth time T5.

A transmission transistor TX may be turned on from the fifth time T5 to a sixth time T6 in response to a transmission control signal TS. As the transmission transistor TX is turned on, the photo charges generated during the current frame may be transmitted to the floating diffusion node NFD.

After the sixth time T6, a second pixel signal PIX2 corresponding to an amount of photo charges accumulated in the pixel 26 during the current frame may be output from the pixel 26. That is, each of the first pixel signal PIX1 and the second pixel signal PIX2 is an analog signal, and may be sequentially output during the current frame.

The output second pixel signal PIX2 is input to the pixel signal input node NPI, and a voltage of the pixel signal input node NPI is equal to a voltage VPIX2 of the second pixel signal PIX2. Here, the voltage difference VPIX1-VX at the second time T2 is maintained at both ends of the first coupling capacitor CAZ1, so that a voltage of the comparison value input node NCI may be changed from VX to VX+(VPIX2-VPIX1). That is, the first coupling capacitor CAZ1 may store a difference VPIX2-VPIX1 between a voltage VPIX1 of the first pixel signal PIX1 and a voltage VPIX2 of the second pixel signal PIX2.

The first coupling capacitor CAZ1 may be described as an example of the pixel signal difference storage circuit which may store a difference between the first pixel signal PIX1 and the second pixel signal PIX2; however, the scope of the present inventive concepts is not restricted thereto.

The comparator 42 may compare a reference voltage VX input through the reference value input node NRI and a voltage VX+VPIX2-VPIX1 of the comparison value input node NCI, and generate a comparison signal SCOMP according to a result of the comparison. That is, the comparator 42 may convert a difference VPIX2-VPIX1 between a voltage VPIX1 of the first pixel signal PIX1 and a voltage VPIX2 of the second pixel signal PIX2 into a comparison signal SCOMP which is a one-bit digital signal.

The term of 'reference voltage' used herein may denote not only a voltage, e.g., VX, supplied to the reference value input node NRI of the comparator 42 but also comprehensively a voltage which is a reference voltage when the comparator 42 generates a comparison signal SCOMP or a voltage, e.g., 0V, which is a comparison reference with a difference VPIX2-VPIX1 between a voltage VPIX1 of the first pixel signal PIX1 and a voltage VPIX2 of the second pixel signal PIX2.

For example, the comparator 42 may generate a comparison signal SCOMP having a high level when the voltage VPIX2 of the second pixel signal PIX2 of the present frame is higher than the voltage VPIX1 of the first pixel signal PIX1 of the previous frame, and generate a comparison signal SCOMP having a low level when the voltage VPIX2 of the second pixel signal PIX2 is lower than the voltage VPIX1 of the first pixel signal PIX1 of the previous frame.

Figure 5:
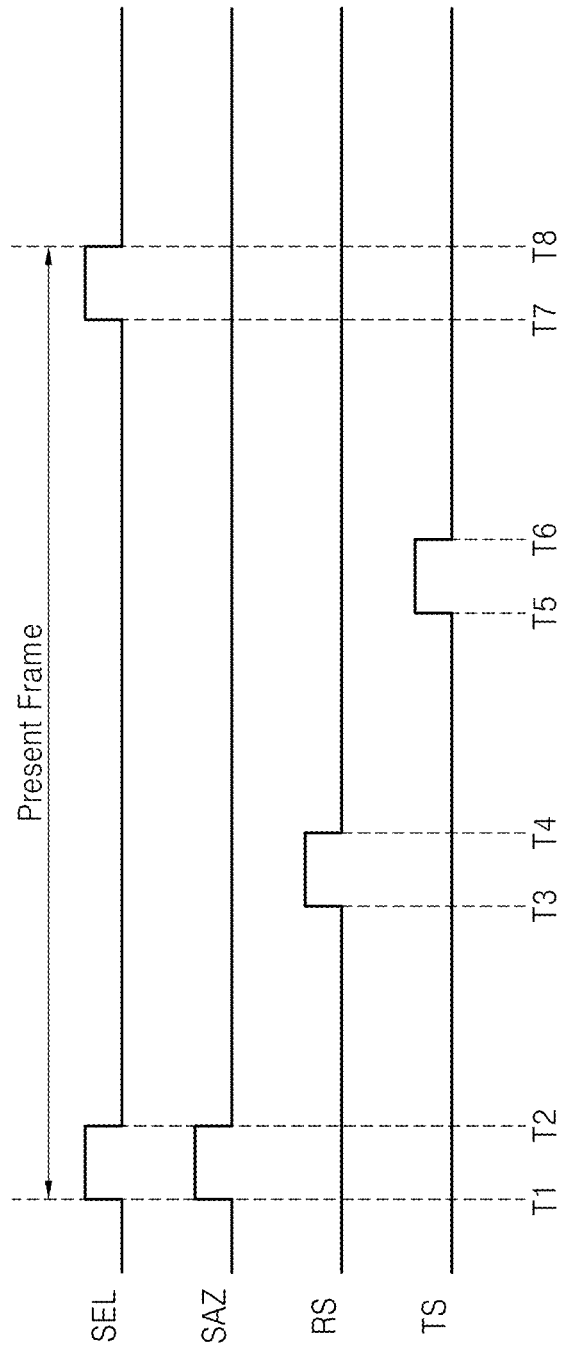
FIG. 5 is a timing diagram according to another example embodiment of the control signals illustrated in FIG. 3.

FIG. 5 is a timing diagram according to another example embodiment of the control signals illustrated in FIG. 3.

Referring to FIGS. 3 to 5, a timing of control signals SAZ, RS, and TS illustrated in FIG. 5 except for a selection signal SEL is substantially the same as a timing of the control signals SAZ, RS, and TS illustrated in FIG. 4.

The selection transistor SX may be turned on at a time when the pixel signal PIX1 or PIX2 needs to be output. That is, the selection transistor SX may be turned on in a section between a first time T1 and a second time T2 where a voltage of the pixel signal input node NPI is initialized using the first pixel signal PIX1 corresponding to a previous frame, and in a section between a seventh time T7 and an eighth time T8 where a second pixel signal PIX2 corresponding to a current frame is input to the pixel signal input node NPI.

Figure 6:
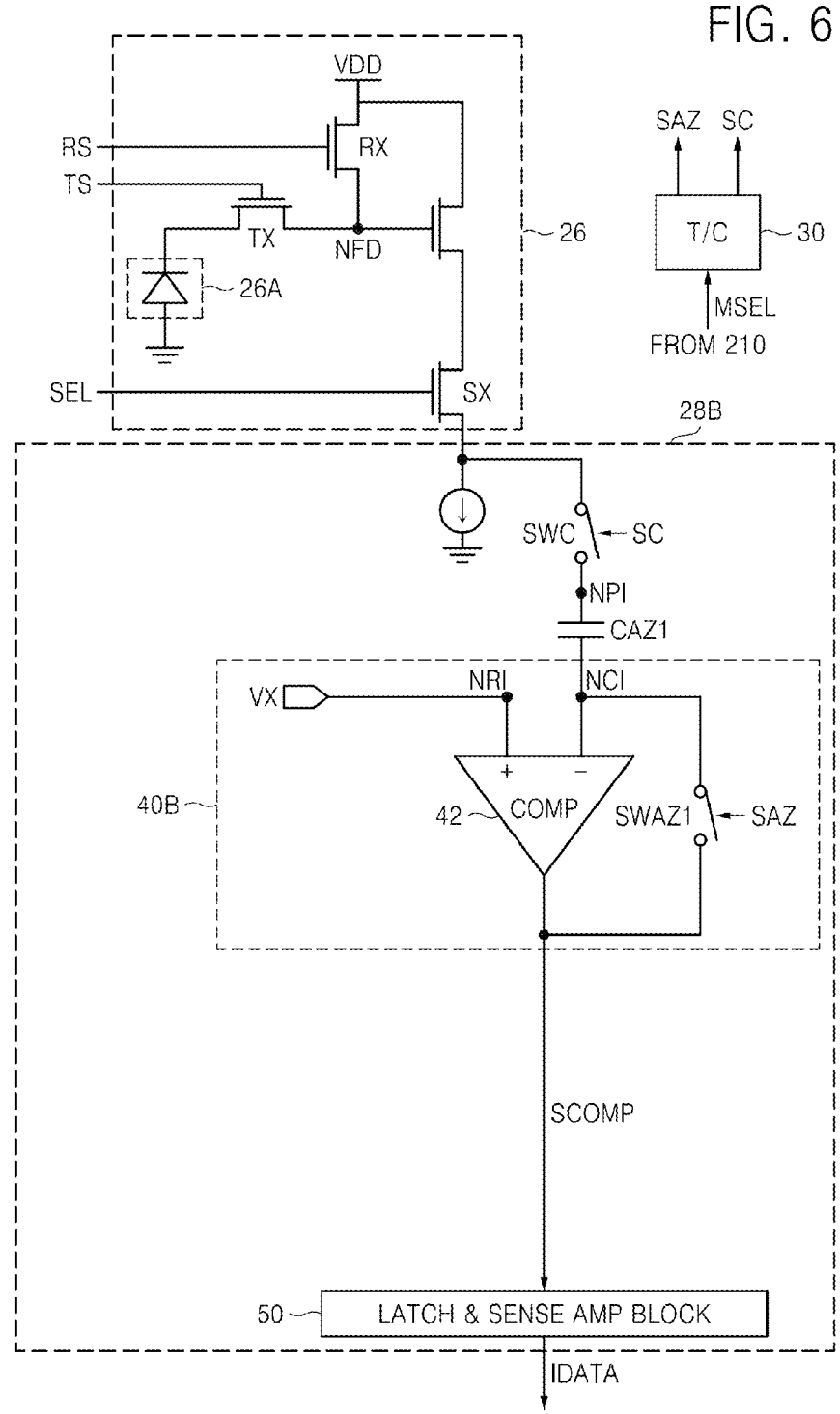
FIG. 6 is a circuit diagram of the pixel illustrated in FIG. 2 and a readout circuit according to another example embodiment.

FIG. 6 is a circuit diagram of the pixel illustrated in FIG. 2 and a readout circuit according to another example embodiment.

Referring to FIGS. 2, 3, and 6, a structure and an operation of a readout circuit 28B according to another example embodiment of the readout circuit 28 illustrated in FIG. 2 are substantially the same as a structure and an operation of the readout circuit 28A illustrated in FIG. 3 except for a pixel signal output switch SWC.

The pixel signal output switch SWC may be connected between the pixel 26 and the first coupling capacitor CAZ1.

The timing controller 30 may generate a switching signal SC based on the mode selection signal MSEL. The pixel signal output switch SWC may be switched in response to the switching signal SC generated by the timing controller 30. A detailed operation of the pixel signal output switch SWC will be described below in more detail referring to FIG. 7.

A structure and an operation of the analog-to-digital conversion circuit 40B in FIG. 6 are substantially the same as a structure and an operation of the analog-to-digital conversion circuit 40A illustrated in FIG. 3.

Figure 7:
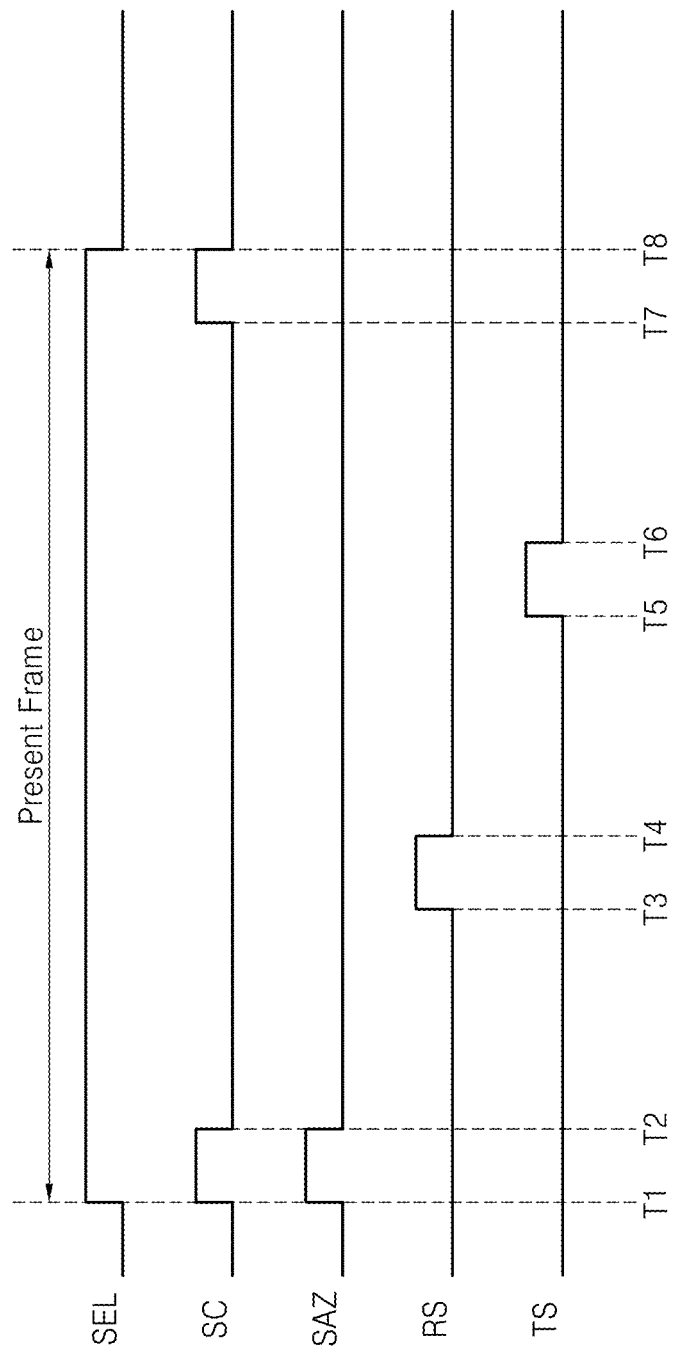
FIG. 7 is a timing diagram according to another example embodiment of the control signals illustrated in FIG. 6.

FIG. 7 is a timing diagram according to another example embodiment of the control signals illustrated in FIG. 6. Referring to FIGS. 4, 6, and 7, a timing of the control signals SEL, SAZ, RS and TS illustrated in FIG. 7 are substantially the same as a timing of the control signals SEL, SAZ, RS and TS illustrated in FIG. 4 except for the switching signal SC.

The pixel signal output switch SWC may be turned on only during a time where a pixel signal PIX1 or PIX2 needs to be output, in response to switching signal SC. That is, the pixel signal output switch SWC may be turned on in the section between the first time T1 and the second time T2, and the section between the seventh time T7 and the eighth time T8.

A section between the first time T1 and the second time T2 is a section where a voltage of the pixel signal input node NPI is initialized using the first pixel signal PIX1 corresponding to a previous frame. The section between the seventh time T7 and the eighth time T8 is a section where the second pixel signal PIX2 corresponding to a current frame is input to the pixel signal input node NPI.

Figure 8:
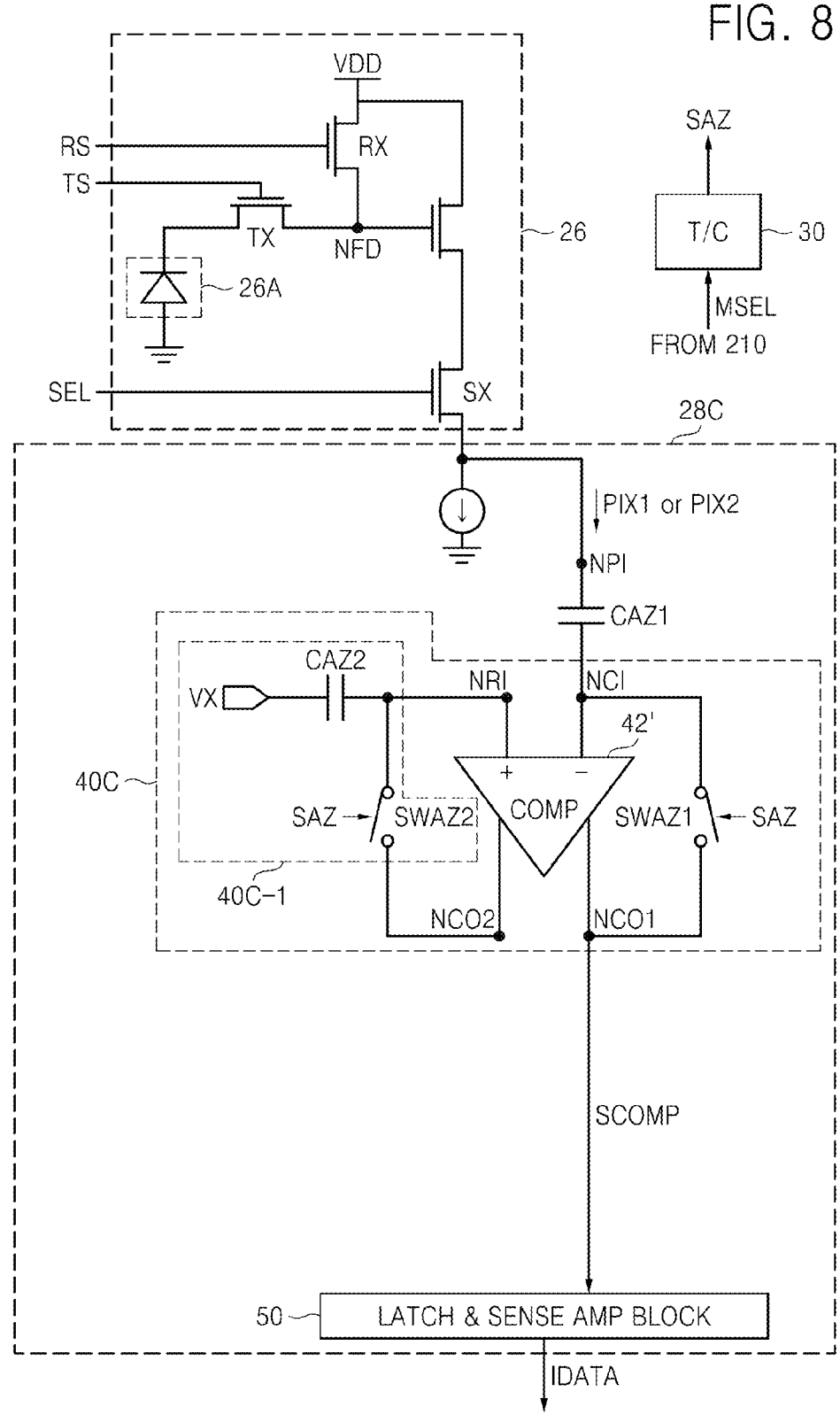
FIG. 8 is a circuit diagram of the pixel illustrated in FIG. 2 and the readout circuit according to still another example embodiment.

FIG. 8 is a circuit diagram of the pixel illustrated in FIG. 2 and the readout circuit according to still another example embodiment.

Referring to FIGS. 2, 3, and 8, a readout circuit 28C according to still another example embodiment of the readout circuit 28 illustrated in FIG. 2 includes the first coupling capacitor CAZ1, an analog-to-digital conversion circuit 40C, and the latch and sense amplifier block 50.

A comparator 42' included in the analog-to-digital conversion circuit 40C may have two output nodes NCO1 and NCO2 unlike the comparator 42 illustrated in FIG. 3, and an output value output through each of the two output nodes NCO1 and NCO2 may be complementary to each other. The analog-to-digital conversion circuit 40C includes a reference voltage supply circuit 40C-1. The reference voltage supply circuit 40C-1 includes a second initialization switch SWAZ2 connected between a second output node NCO2 of the comparator 42' and the reference value input node NRI. The second initialization switch SWAZ2 and the first initialization switch SWAZ1 may be switched together by the switching signal SAZ.

The reference voltage supply circuit 40C-1 may include a second coupling capacitor CAZ2 between a power source VX and the reference value input node NRI.

When performing an initialization operation, as the first initialization switch SWAZ1 and the second initialization switch SWAZ2 are turned on together, the reference value input node NRI and the comparison value input node NCI may be initialized to an arbitrary voltage value. In this case, the arbitrary voltage may be a reference voltage.

Figure 9:
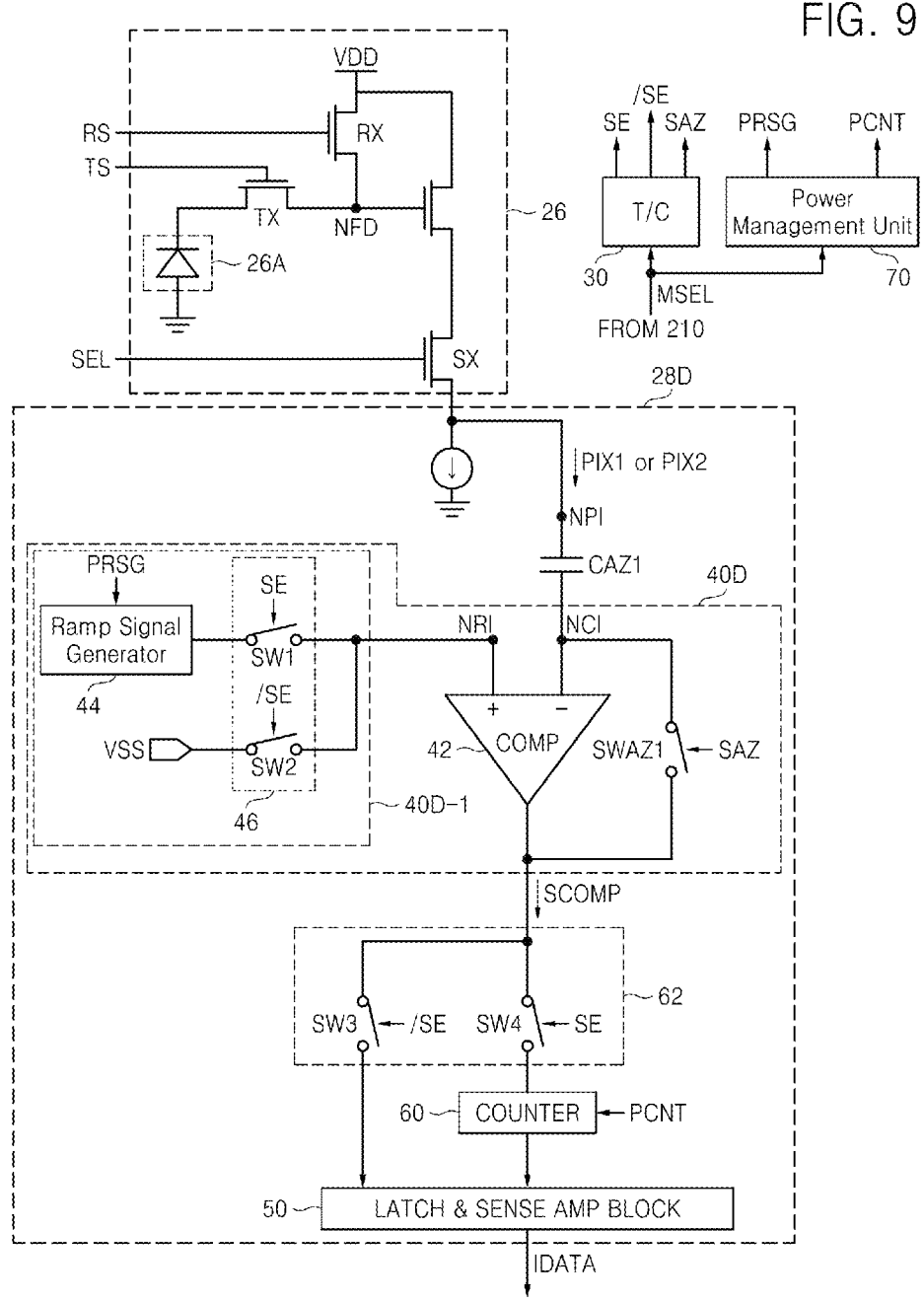
FIG. 9 is a circuit diagram of the pixel illustrated in FIG. 2 and the readout circuit according to still another example embodiment.

FIG. 9 is a circuit diagram of the pixel illustrated in FIG. 2 and the readout circuit according to still another example embodiment.

Referring to FIGS. 2, 3, and 9, a readout circuit 28D according to still another example embodiment of the readout circuit 28 illustrated in FIG. 2 includes an analog-to-digital conversion circuit 40D, the latch and sense amplifier block 50, a counter 60, and a second switch array 62.

The analog-to-digital conversion circuit 40D may include a ramp signal generator 44 and a first switch array 46. The ramp signal generator 44 may generate a ramp signal and supply the generated ramp signal to the comparison value input node NRI. The first switch array 46 may include switches SW1 and SW2, and supply one of the ramp signal and the reference voltage VSS to the reference value input node NRI in response to switching signals SE and /SE.

According to an example embodiment, the first switch array 46 may supply the ramp signal to the reference value input node NRI according to the switching signals SE and /SE generated by the timing controller 30 based on the mode selection signal MSEL for operating the image sensor 100 of FIG. 1 in a conventional color image sensing mode.

According to another example embodiment, the first switch array 46 may supply the reference voltage VSS to the reference value input node NRI according to the switching signals SE and /SE generated by the timing controller 30 based on the mode selection signal MSEL for operating the image sensor 100 of FIG. 1 in a motion sensing mode.

The counter 60 may count level transition time of a comparison signal SCOMP in response to a clock signal (not shown).

The second switch array 62 may include switches SW3 and SW4, and supply the comparison signal SCOMP to one of the counter 60 and a latch included in the latch and sense amplifier block 50 in response to the switching signals SE and /SE.

According to an example embodiment, the second switch array 62 may supply the comparison signal SCOMP to the counter 60 according to the switching signals SE and /SE generated by the timing controller 30 based on the mode selection signal MSEL for operating the image sensor 100 of FIG. 1 in a conventional color image sensing mode.

According to another example embodiment, the second switch array 62 may supply the comparison signal SCOMP to the latch included in the latch and sense amplifier block 50 according to the switching signal SE and /SE generated by the timing controller 30 based on the motion selection signal MSEL for operating the image sensor 100 of FIG. 1 in a motion sensing mode.

A power management unit 70 may control a power signal PRSG or PCNT supplied to each of the ramp signal generator 44 and the counter 60 based on the mode selection signal MSEL transmitted from the CPU 210.

According to an example embodiment, the power management unit 70 may turn off a power of the ramp signal generator 44 and the counter 60 by controlling a power signal PRSG or PCNT based on the mode selection signal MSEL for operating the image sensor 100 of FIG. 1 as the image sensor sensing a motion.

According to another example embodiment, the power management unit 70 may activate one-bit only of a latch (not shown), which is included in the latch and sense amplifier block 50 and latches a plurality of bits, based on the mode selection signal MSEL for operating the image sensor 100 of FIG. 1 as the image sensor sensing a motion.

According to still another example embodiment, when sensing a motion using some of the pixels 26 included in the pixel array 24 of the image sensor 100, the power management unit 70 may control a power supply to an unnecessary portion for sensing a motion, e.g., a portion of the readout circuit 28 and a portion of the row decoder 34, among configurations included in the image sensor 100 in addition to the ramp signal generator 44 and the counter 60.

According to operations of the power management unit 70, a power consumed in the image sensor 100 of FIG. 1 may be reduced.

Figure 10:
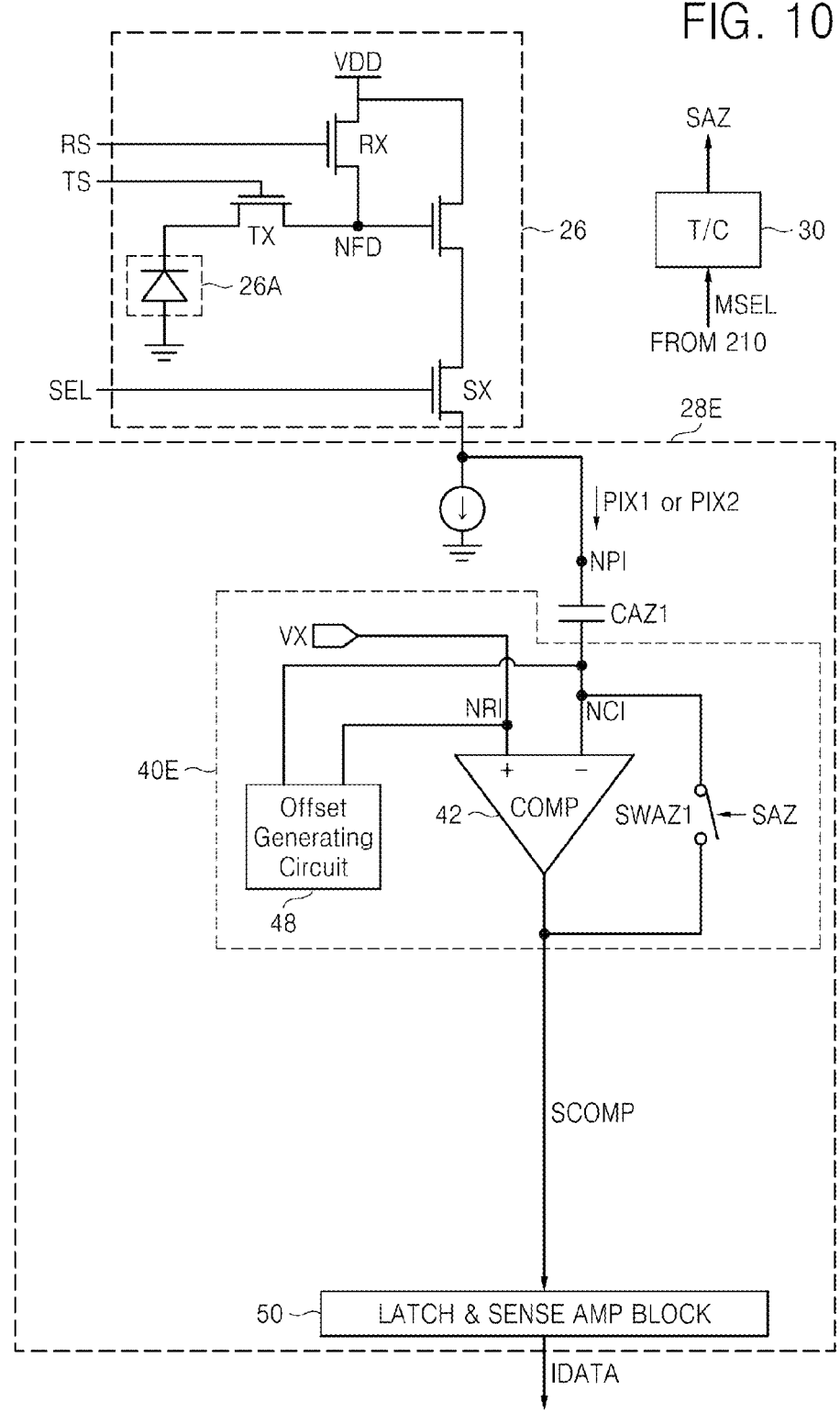
FIG. 10 is a circuit diagram of the pixel illustrated in FIG. 2 and the readout circuit according to still another example embodiment.

FIG. 10 is a circuit diagram of the pixel illustrated in FIG. 2 and the readout circuit according to still another example embodiment.

Referring to FIGS. 2, 3, and 10, a readout circuit 28E according to still another example embodiment of the readout circuit 28 illustrated in FIG. 2 includes an analog-to-digital conversion circuit 40E and the latch and sense amplifier block 50.

The analog-to-digital conversion circuit 40E may include an offset generating circuit 48. The offset generating circuit 48 may supply an offset voltage having a different value to each of the comparison value input node NCI and the reference value input node NRI. An error caused by a noise may be reduced using the offset voltage supplied from the offset generation circuit 48.

Regarding a structure and an operation of the offset generating circuit 48 will be described in detail referring to FIGS. 11 to 13.

Figure 11:
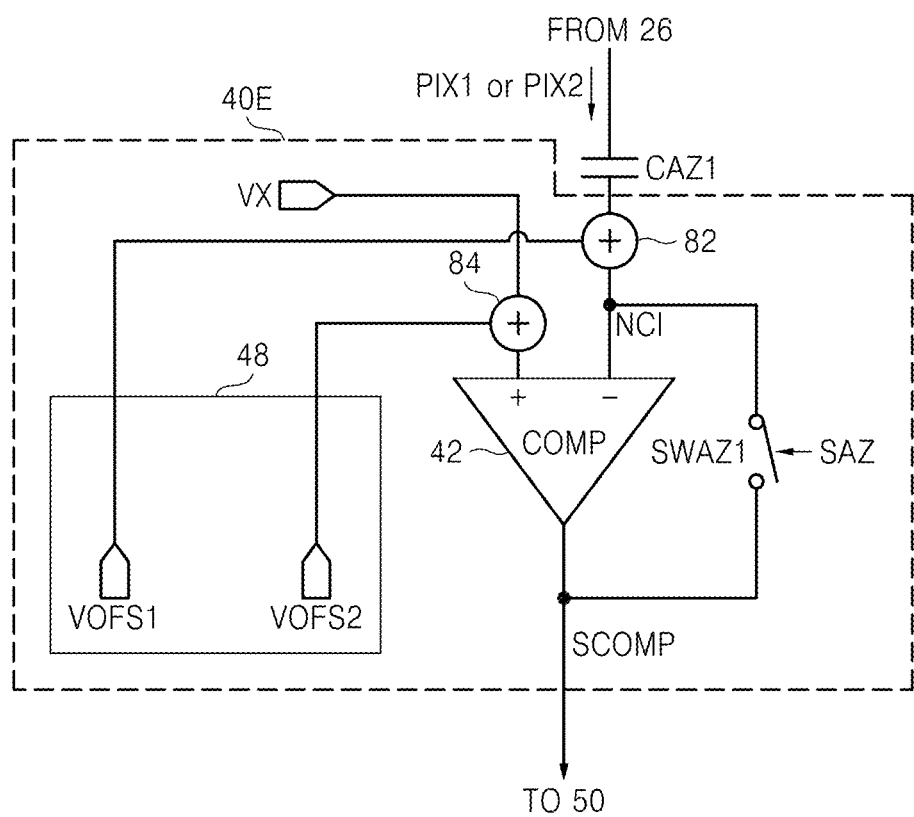
FIG. 11 is a circuit diagram of an analog to digital conversion circuit illustrated in FIG. 10.

FIG. 11 is a circuit diagram of an analog to digital conversion circuit illustrated in FIG. 10. FIG. 12 is a graph according to an example embodiment of a comparison signal illustrated in FIG. 11. FIG. 13 is a graph according to another example embodiment of the comparison signal illustrated in FIG. 11.

Referring to FIGS. 10 to 13, the offset generating circuit 48 adds a first offset voltage VOFS1 to a voltage of the comparison value input node NCI through an adder 82, and the offset generating circuit 48 may add a second offset voltage VOFS2 to the reference voltage VX through the adder 84. The adder 84 is located in the reference value input node NRI.

The reference input node NRI and the comparison value input node NCI have an offset voltage difference by offset voltages VOFS1 and VOFS2. That is, by the offset voltage difference VOFS=VOFS2−VOFS1, a reference voltage which is a reference of comparison of the comparator 42 may be changed.

Figure 12:
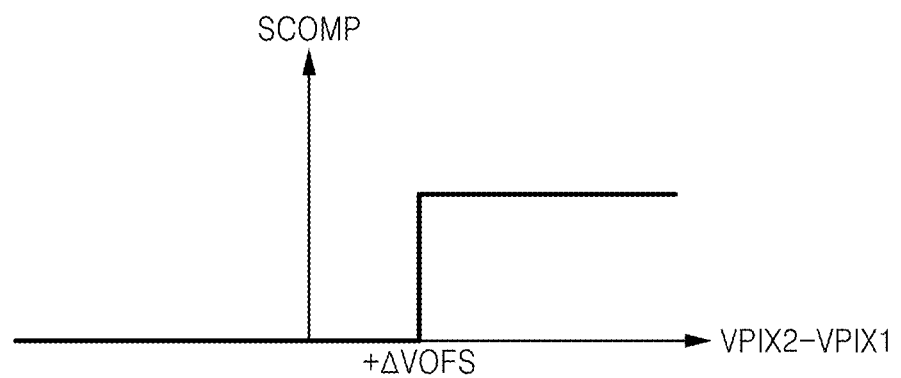
FIG. 12 is a graph according to an example embodiment of a comparison signal illustrated in FIG. 11.

When the offset voltage difference has a positive value, the comparison signal SCOMP has values as illustrated in FIG. 12. For example, when a difference between a voltage VPIX2 of the second pixel signal PIX2 corresponding to a current frame and a voltage VPIX1 of the first pixel signal PIX1 corresponding to a previous frame is equal to or more than the offset voltage difference +ΔVOFS, the comparison signal SCOMP may be at a high level, and when the difference is less than the offset voltage difference +ΔVOFS, the comparison signal SCOMP may be at a low level.

That is, when a voltage VPIX2 of the second pixel signal PIX2 is higher than a voltage VPIX1 of the first pixel signal PIX1 within an error range, e.g., +ΔVOFS, the comparison signal SCOMP may be at a low level.

Figure 13:
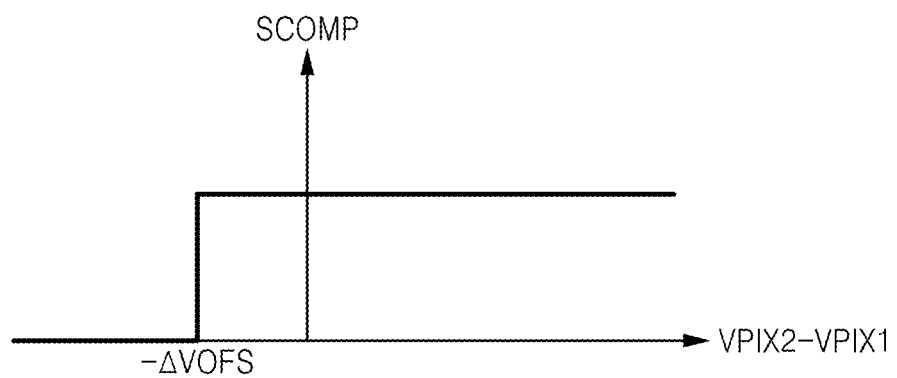
FIG. 13 is a graph according to another example embodiment of the comparison signal illustrated in FIG. 11.

When the offset voltage difference has a negative value, the comparison signal SCOMP has values as illustrated in FIG. 13. For example, the difference between a voltage VPIX2 of the second pixel signal PIX2 corresponding to a current frame and a voltage VPIX1 of the first pixel signal PIX1 corresponding to a previous frame is equal to or more than the offset voltage difference −ΔVOFS, the comparison signal SCOMP may be at a high level, and when the difference is less than the differential offset voltage difference −ΔVOFS, the comparison signal SCOMP may be at a low level. That is, when the voltage VPIX2 of the second pixel signal PIX2 is less than the voltage VPIX1 of the first pixel signal PIX1 within an error range, e.g., −ΔVOFS, the comparison signal SCOMP may be at a high level.

Figure 14:
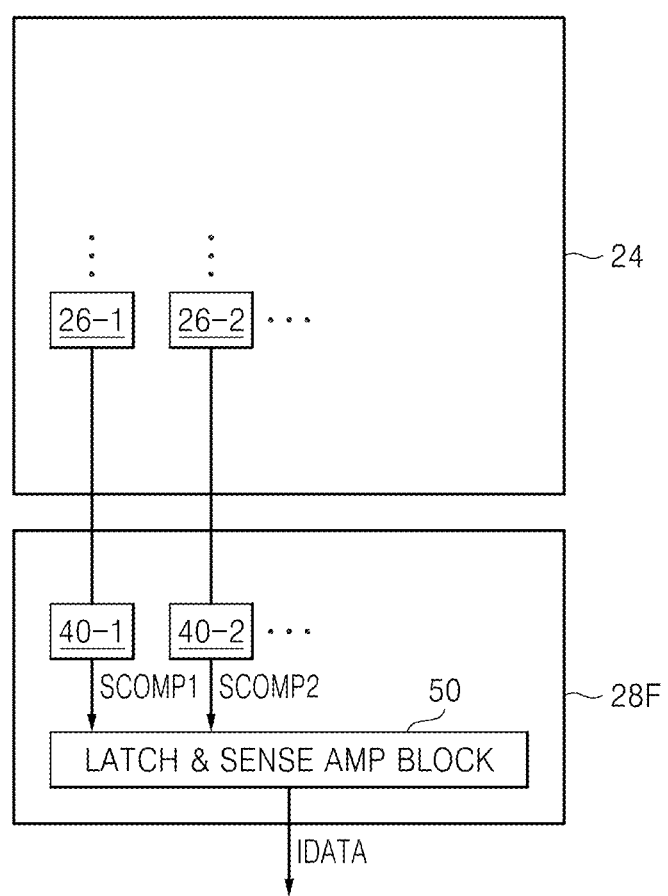
FIG. 14 is a circuit diagram of a pixel array illustrated in FIG. 2 and the readout circuit according to still another example embodiment.

FIG. 14 is a circuit diagram of a pixel array illustrated in FIG. 2 and the readout circuit according to still another example embodiment. Referring to FIGS. 2, 10 to 14, a readout circuit 28F according to still another example embodiment of the readout circuit 28 illustrated in FIG. 2 may include a plurality of a analog-to-digital conversion circuits including a first analog-to-digital conversion circuit 40-1 and a second analog-to-digital conversion circuit 40-2.

The first analog-to-digital conversion circuit 40-1 and the second analog-to-digital conversion circuit 40-2 are substantially the same as the analog-to-digital conversion circuit 40-E illustrated in FIG. 11 in a structure and an operation.

For convenience of description in FIG. 14, the first coupling capacitor CAZ1 is not illustrated; however, the first coupling capacitor CAZ1 may be connected between each pixel 26-1 or 26-2 and each analog-to-digital conversion circuit 40-1 or 40-2.

According to an example embodiment, the offset voltage difference ΔVOFS of the first analog-to-digital conversion circuit 40-1 has a positive value, and the offset voltage difference ΔVOFS of the second analog-to-digital conversion circuit 40-2 has a negative value. That is, a reference voltage supplied to a comparator included in the first analog-to-digital conversion circuit 40-1 may be different from a reference voltage supplied to a comparator included in the second analog-to-digital conversion circuit 40-1.

In this case, the first analog-to-digital conversion circuit 40-1 may have a first comparison signal SCOMP at a low level when a voltage of a pixel signal corresponding to a current frame is higher than a voltage of a pixel signal corresponding to a previous frame within an error range, e.g., ΔVOFS.

The second analog-to-digital conversion circuit 40-2 may have a second comparison signal SCOMP2 at a high level when a voltage of a pixel signal corresponding to a current frame is lower than a voltage of a pixel signal corresponding to a previous frame within an error range, e.g., −ΔVOFS.

The first comparison signal SCOMP1 and the second comparison signal SCOMP2 at a low level mean that a voltage of a pixel signal corresponding to a current frame is lower than a voltage of a pixel signal corresponding to a previous frame, i.e., an amount of light is reduced.

The first comparison signal SCOMP at a low level, and the second comparison signal SCOMP2 at a high level mean that a voltage of the pixel signal corresponding to the current frame is equal to a voltage of the pixel signal corresponding to the previous frame within an error range, e.g., −ΔVOFS to +ΔVOFS, i.e., the amount of light is maintained without being changed. The first comparison signal SCOMP and the second comparison signal SCOMP2 at a high level mean that a voltage of the pixel signal corresponding to the current frame is higher than a voltage of the pixel signal corresponding to the previous frame, i.e., the amount of light is increased.

Based on the first comparison signal SCOMP1 and the second comparison signal SCOMP2, image data IDATA including motion information may be output from the read out circuit 28F.

Figure 15:
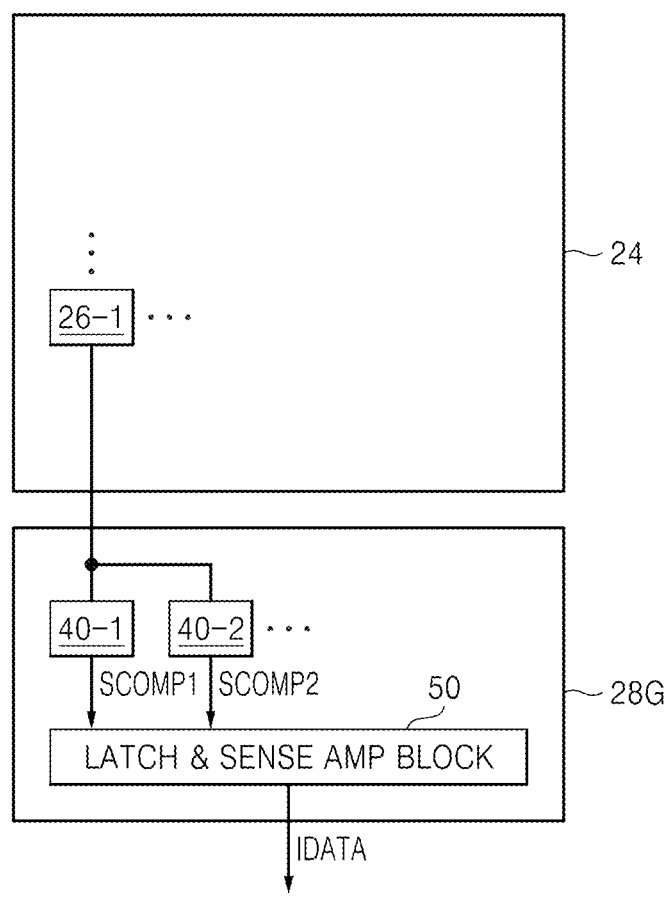
FIG. 15 is a circuit diagram of the pixel array illustrated in FIG. 2 and the readout circuit according to still another example embodiment.

FIG. 15 is a circuit diagram of the pixel array illustrated in FIG. 2 and the readout circuit according to still another example embodiment. For convenience of description in FIG. 15, the first coupling capacitor CAZ1 is not illustrated; however, the first coupling capacitor CAZ1 may be connected between the pixel 26-1 and each analog-to-digital conversion circuit 40-1 or 40-2.

Referring to FIGS. 2 and 10 to 15, a readout circuit 28G according to still another example embodiment of the readout circuit 28 illustrated in FIG. 2 may perform substantially the same operation as a readout circuit 28F illustrated in FIG. 14 but using pixel signals output from only one pixel 26-1.

Figure 16:
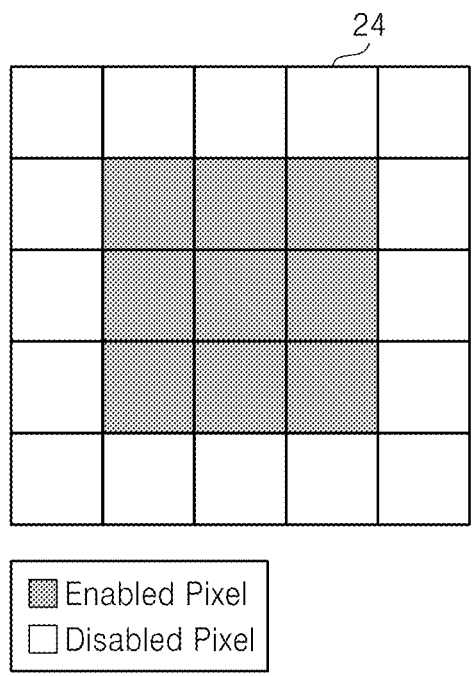
FIG. 16 is a drawing depicting an activation pixel group according to an example embodiment of the pixel array illustrated in FIG. 2.

FIG. 16 is a drawing depicting an activation pixel group according to an example embodiment of the pixel array illustrated in FIG. 2.

Figure 17:
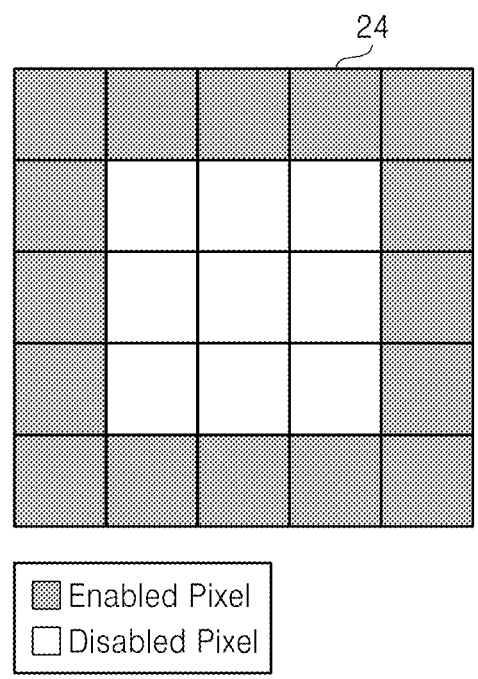
FIG. 17 is a drawing depicting an activation pixel group according to another example embodiment of the pixel array illustrated in FIG. 2.
Figure 18:
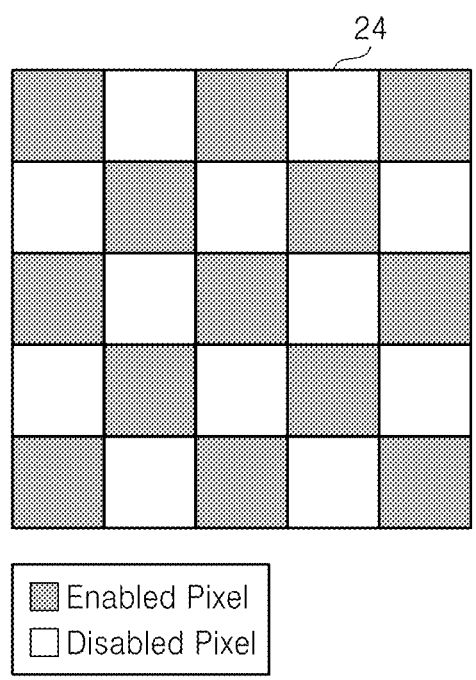
FIG. 18 is a drawing depicting an activation pixel group according to still another example embodiment of the pixel array illustrated in FIG. 2.

FIG. 17 is a drawing depicting an activation pixel group according to another example embodiment of the pixel array illustrated in FIG. 2. FIG. 18 is a drawing depicting an activation pixel group according to still another example embodiment of the pixel array illustrated in FIG. 2.

Referring to FIGS. 2 and 16 to 18, when the image sensor 100 illustrated in FIG. 2 operates in a motion sensing mode, an enable pixel group may be selected and operated which includes a pixel to be used in motion sensing among a plurality of pixels included in the pixel array 24 based on the mode selection signal MSEL.

In case of FIG. 16, the enable pixel group may be located in a dense region. That is, pixels included in the enable pixel group may be adjacent to each other.

In this case, by using the enable pixel group located in a dense region, sensitivity or resolution of the motion sensing may be increased.

In case of FIG. 17, the enable pixel group may be located at the edges of the pixel array 24. In case of FIG. 18, the enable pixel group may be located in a dispersed region. That is, pixels included in the enable pixel group may not be adjacent to each other. In this case, by using the enable pixel group located in the dispersed region, an operation in a wider range may be sensed.

Figure 19:
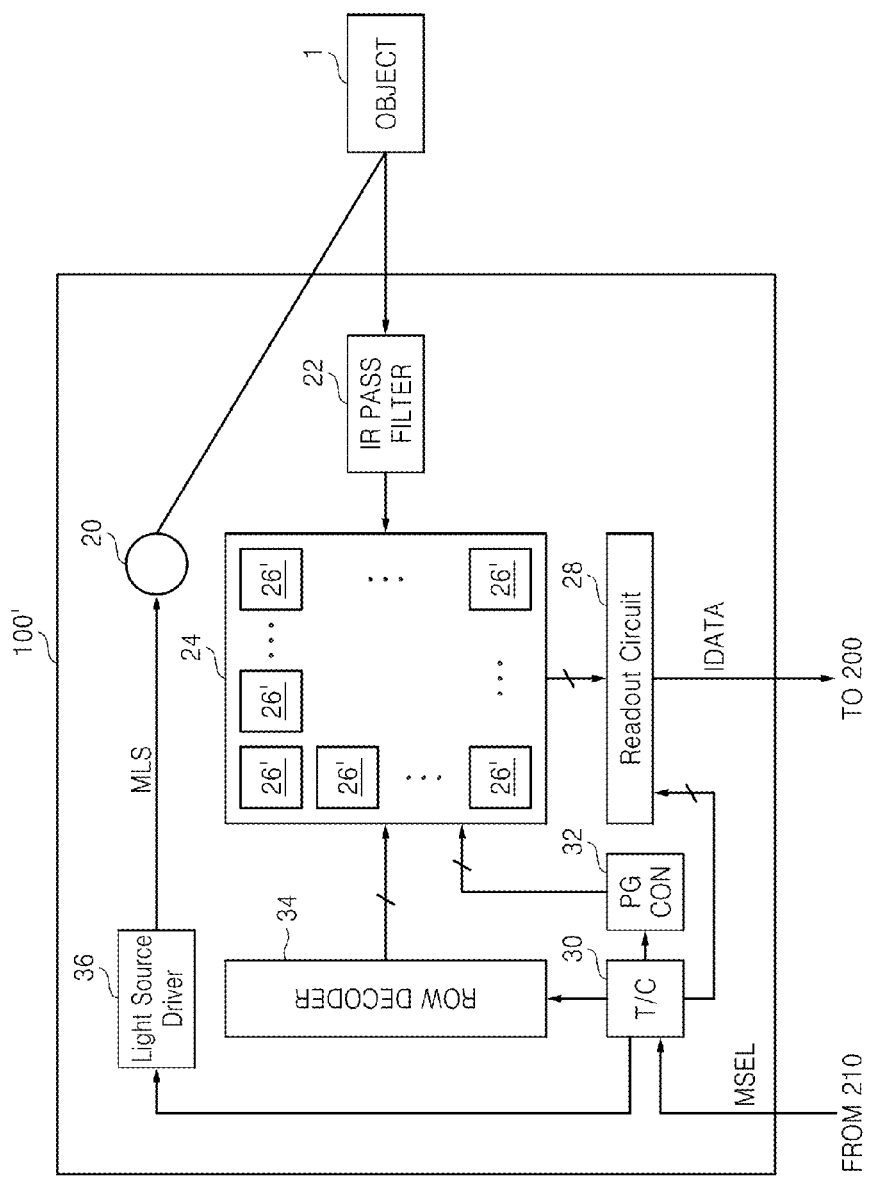
FIG. 19 is a block diagram according to another example embodiment of the image sensor illustrated in FIG. 1.

FIG. 19 is a block diagram according to another example embodiment of the image sensor illustrated in FIG. 1.

Referring to FIGS. 1, 2, and 19, an image sensor 100' according to another example embodiment of the image sensor 100 illustrated in FIG. 1 may be an image sensor operating in a time of flight (TOF) method.

The image sensor 100' may further include a light source 20, a infrared ray (IR) pass filter 22, a photo gate controller 32, and a light source driver 36.

The light source 20 may emit an optical signal modulated to an object 1 according to a control signal MLS of the light source driver 36, e.g., an infrared ray. The infrared ray pass filter 22 may be emitted from the light source 20 and cause only an optical signal reflected from the object 1 to pass through the pixel array 24. The pixel array 24 may include a plurality of pixels 26'. Each of the plurality of pixels 26' may be embodied in a TOF sensor pixel.

A photo gate controller 32 may generate photo gate control signals according to a control of the timing controller 30, and transmits the generated photo gate control signals to the pixel array 24.

Figure 20:
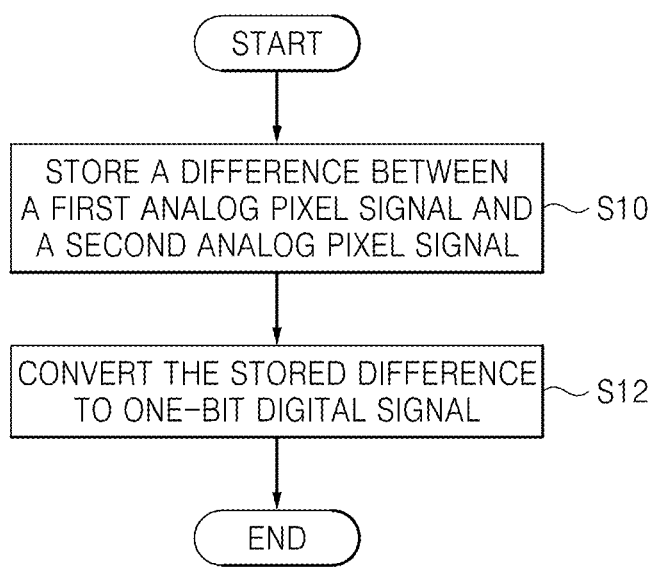
FIG. 20 is a flowchart of a method of operating the image sensor according to an example embodiment of the present inventive concepts.

FIG. 20 is a flowchart of a method of operating an image sensor according to an example embodiment of the present inventive concepts.

Referring to FIGS. 3 and 20, the first coupling capacitor CAZ1 may store a difference between a first pixel signal PIX1 corresponding to a previous frame of the pixel 26 and a second pixel signal PIX2 corresponding to a current frame of the pixel 26 (S10).

The first pixel signal PIX1 may correspond to an amount of charges of photo charges accumulated in the pixel 26 during a previous frame, and a second pixel signal PIX2 corresponds to an amount of charges of photo charges accumulated in the pixel 26 during a current frame. An analog to digital conversion circuit 40A may convert the stored difference to a one-bit digital signal, e.g., a comparison signal SCOMP, and output the result (S12).

Figure 21:
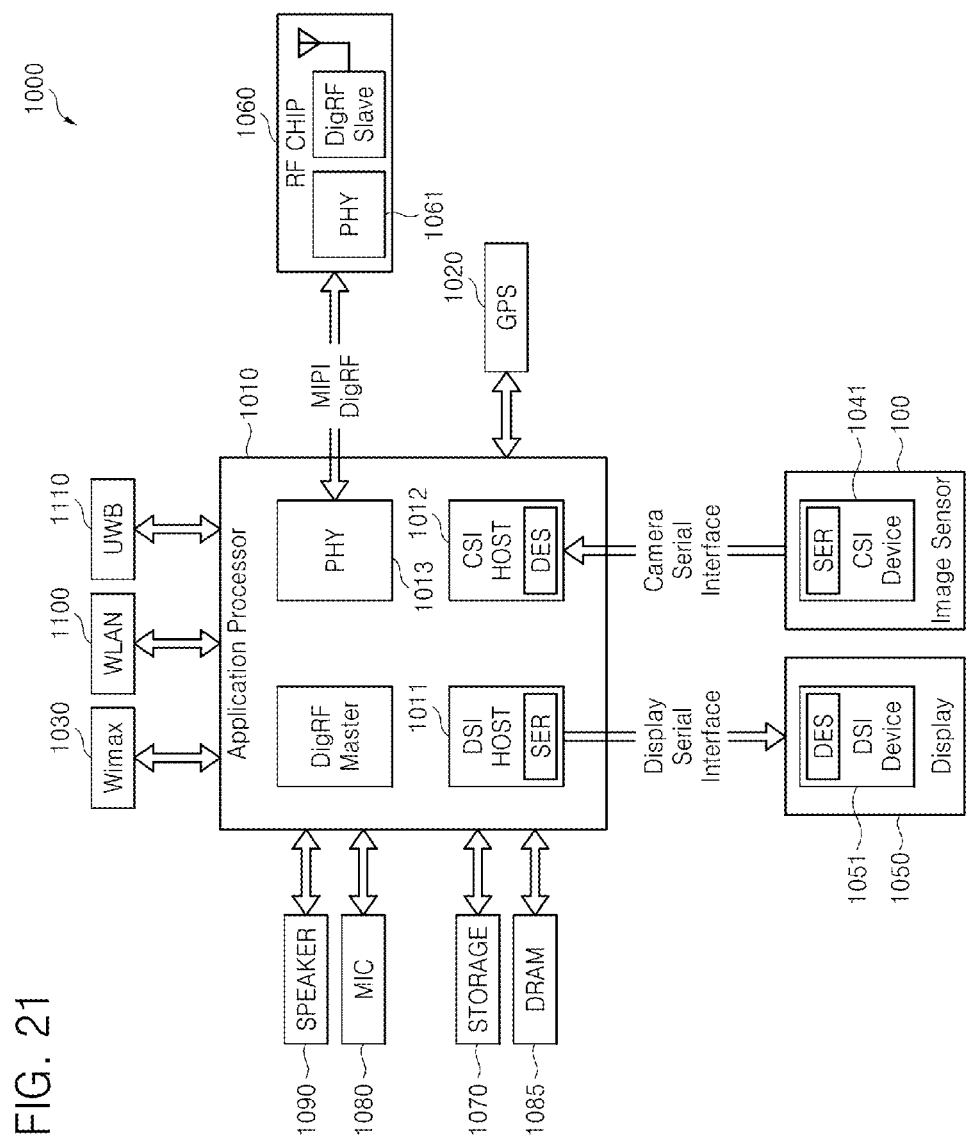
FIG. 21 is a block diagram according to an example embodiment of a system including the image sensor of FIG. 1.

FIG. 21 is a block diagram according to an example embodiment of a system including the image sensor of FIG. 1.

Referring to FIGS. 1 and 21, an electronic system 1000 may be embodied in a data processing device which may use or support a mobile industry processor interface (MIPI®), e.g., personal digital assistant (PDA), portable multimedia player (PMP), internet protocol television (IPTV) or smart phone.

The electronic system 1000 includes the image sensor of FIG. 1, an application processor 1010, and a display 1050.

A camera serial interface (CSI) host 1012 embodied in the application processor 1010 may perform a serial communication with a CSI device 1041 of the image sensor 100 through a camera serial interface. Here, for example, the CSI host 1012 may include a de-serializer (DES), and the CSI device 1041 may include a serializer (SER).

A DSI host 1011 embodied in the application processor 1010 may perform a serial communication with a DSI device 1051 of the display 1050 through a display serial interface (DSI). Here, for example, the DSI host 1011 may include a serializer (SER), and the DSI device 1051 may include a de-serializer (DES).

According to an example embodiment, the electronic system 1000 may further include a RF chip 1060 which may communicate with the application processor 1010. A PHYsical layer 1013 included in the application processor 1010 may transmit or receive data to/from a PHY 1061 included in the RF chip 1060 according to MIPI DigRF.

According to an example embodiment, the electronic system 1000 may further include a GPS receiver 1020, a storage 1070, a microphone (MIC) 1080, a dynamic random access memory (DRAM) 1085, and a speaker 1090.

The electronic system 1000 may use a world interoperability for microwave access (Wimax) 1030 module, a wireless LAN (WLAN) 1100 module, and/or a ultra wideband (UWB) 1110 module, and perform a communication.

Figure 22:
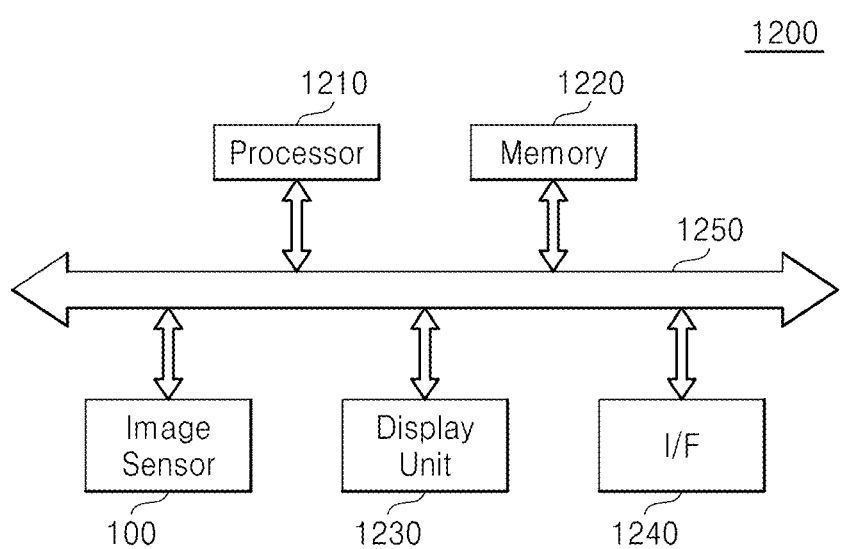
FIG. 22 is a block diagram according to another example embodiment of the system including the image sensor of FIG. 1.

FIG. 22 is a block diagram according to another example embodiment of the system including the image sensor of FIG. 1.

Referring to FIGS. 1 and 22, an image processing system 1200 may further include the image sensor 100 of FIG. 1, a processor 1210, a memory 1220, a display unit 1230, and an interface 1240.

According to an example embodiment, the image processing system 1200 may be embodied in a medical device or a portable electronic device. The portable electronic device may be embodied in a mobile phone, a smart phone, a tablet PC, a personal digital assistant (PDA), an enterprise digital assistant (EDA), a portable multimedia player (PMP), or an e-book.

The processor 1210 may control an operation of the image sensor 100 or process image data output from the image sensor 100. According to an example embodiment, the processor 1210 may denote an ISP 200.

A memory 1220 may store a program for controlling an operation of the image sensor 100 and an image generated by the processor 1210 through a bus 1250 according to a control of the processor 1210, and the processor 1210 may perform the program by accessing the stored information. The memory 1220 may be embodied in a non-volatile memory, for example.

The display unit 1230 may receive an image from the processor 1210 or the memory 1220 and display the image through a display, e.g., Liquid Crystal Display (LCD), LED display, OLED display, Active Matrix Organic Light Emitting Diodes (AMOLED) display, or flexible display.

The interface 1240 may be embodied in an interface for inputting/outputting a two or three dimensional image. According to an example embodiment, the interface 1240 may be embodied in a wireless interface.

A method and a device according to an example embodiment of the present inventive concepts may sense a motion of an object. The method and the device according to an example embodiment of the present inventive concepts may reduce power consumption by turning off a power of redundant configurations for motion sensing, e.g., ramp signal generator and counter, during sensing a motion of the object.

The method and the device according to an example embodiment of the present inventive concepts may sense an increase, reduction, and retention in an amount of light by using an offset voltage having a different polarity.

Although some example embodiments of the present general inventive concepts have been shown and described, it will be appreciated by those skilled in the art that changes may be made in these example embodiments without departing from the principles and spirit of the inventive concepts, the scope of which is defined in the appended claims and their equivalents.

What is claimed is:

1. A multi-chip package (MCP) comprising:
   an image sensor including,
      a pixel array including a plurality of pixels configured to generate a plurality of pixel signal during each of a plurality of frames, the plurality of pixels including a first pixel, and
      a readout circuit configured to generate image data based on the plurality of pixel signals, and including a plurality of pixel signal difference storage circuits and a plurality of analog to digital conversion circuits; and
   an image signal processor (ISP) configured to receive the image data, to process the image data and to generate the processed image data, wherein
      a first pixel signal difference storage circuit among the plurality of pixel signal difference storage circuits is configured to store a difference between a first pixel signal corresponding to a previous frame of the first pixel and a second pixel signal corresponding to a current frame of the first pixel, and
      the plurality of analog to digital conversion circuits include a first analog to digital conversion circuit configured to convert the difference between the first pixel signal and the second pixel signal to a digital signal.

2. The MCP of claim 1, wherein the image data corresponds to motion information, to depth information, or to color information.

3. The MCP of claim 2, wherein the image sensor outputs to the ISP the image data corresponding to the motion information, the image data corresponding to the depth information, or, the image data corresponding to the color information, based on a mode selection signal.

4. The MCP of claim 1, wherein the first analog-to-digital conversion circuit includes a comparator configured to compare a reference voltage and the difference between the first pixel signal and the second pixel signal.

5. The MCP of claim 4, wherein the plurality of analog to digital conversion circuits include a plurality of initialization switches connected between one of input nodes of the comparator and an output node of the comparator, and when the plurality of initialization switches turn on, a voltage of the one of the input nodes of the comparator is initialized to be equal to the reference voltage.

6. The MCP of claim 1, wherein each of the plurality of pixel signal difference storage circuits is embodied with a coupling capacitor.

7. The MCP of claim 1, wherein the image sensor includes a power management unit configured to control a power supplied to a counter and a ramp signal generator that are included in the readout circuit, based on a mode selection signal.

8. The MCP of claim 1, further comprising:
   a plurality of pixel signal output switches connected between the plurality of pixels and the a plurality of coupling capacitors, wherein
      the plurality of pixel signal output switches are configured to control an output of each of the plurality of pixel signals, and
      the plurality of pixel signal difference storage circuits are embodied with the plurality of coupling capacitors.

9. An electronic device comprising:
   an image sensor including,
      a pixel array including a plurality of pixels configured to generate a plurality of pixel signal during each of a plurality of frames, the plurality of pixels including a first pixel, and
      a readout circuit configured to generate image data based on the plurality of pixel signals, and including a plurality of pixel signal difference storage circuits and a plurality of analog to digital conversion circuits;
   an image signal processor (ISP) configured to receive the image data, to process the image data and to generate the processed image data;
   a CPU configured to generate a mode selection signal and output the mode selection signal to the image sensor;
   a memory configured to store an image generated by the ISP; and
   a display unit configured to receive the image from the ISP or the memory, and to display the image, wherein
      a first pixel signal difference storage circuit among the plurality of pixel signal difference storage circuits is configured to store a difference between a first pixel signal corresponding to a previous frame of the first pixel and a second pixel signal corresponding to a current frame of the first pixel,
      the plurality of analog to digital conversion circuits include a first analog to digital conversion circuit configured to convert the difference between the first pixel signal and the second pixel signal to a digital signal, and
      the image sensor is configured to output to the ISP the image data corresponding to motion information or the image data corresponding to depth information based on the mode selection signal.

10. The electronic device of claim 9, wherein the image sensor outputs the image data corresponding to the motion information when the mode selection signal is at a first level, and
   the image sensor outputs the image data corresponding to the depth information when the mode selection signal is at a second level.

11. The electronic device of claim 10, wherein the first level is a low level, and the second level is a high level.

12. The electronic device of claim 9, wherein the image sensor and the ISP are embodied in a multi-chip package (MCP).

13. The electronic device C of claim 9, wherein the image sensor and the ISP are embodied in a package on package (PoP).

14. The electronic device of claim 9, wherein the first analog-to-digital conversion circuit includes a comparator configured to compare a reference voltage and the difference between the first pixel signal and the second pixel signal.

15. An image sensor comprising:
  a pixel array including a plurality of pixels configured to generate a plurality of pixel signal during each of a plurality of frames, the plurality of pixels including a first pixel; and
  a readout circuit configured to generate image data corresponding to motion information, to depth information or to color information, based on the plurality of pixel signals, the readout circuit including a plurality of pixel signal difference storage circuits, a plurality of analog to digital conversion circuits, a counter and a ramp signal generator, wherein
    a first pixel signal difference storage circuit among the plurality of pixel signal difference storage circuits is configured to store a difference between a first pixel signal corresponding to a previous frame of the first pixel and a second pixel signal corresponding to a current frame of the first pixel,
    the plurality of analog to digital conversion circuits include a first analog to digital conversion circuit configured to convert the difference between the first pixel signal and the second pixel signal to a digital signal, and
    the image sensor is configured to output the image data corresponding to the motion information, the image data corresponding to the depth information or the image data corresponding to the color information, based on a mode selection signal.

16. The image sensor of claim 15, wherein the first analog-to-digital conversion circuit includes a comparator configured to compare a reference voltage and the difference between the first pixel signal and the second pixel signal.

17. The image sensor of claim 16, wherein the readout circuit includes a latch and sense amplifier block configured to latch a comparison signal received from the comparator.

18. The image sensor of claim 15, further comprising:
  a timing controller configured to control the readout circuit.

19. The image sensor of claim 15, further comprising:
  a power management unit configured to control a power supplied to the counter and the ramp signal generator, based on the mode selection signal.

20. The image sensor of claim 15, wherein
  the plurality of pixels are depth sensor pixels, and
  the image sensor transmits the image data corresponding to the depth information based on the mode selection signal.

* * * * *